US008295682B1

(12) United States Patent
Bhatt (10) Patent No.: US 8,295,682 B1
(45) Date of Patent: Oct. 23, 2012

(54) SELECTING PREVIOUSLY-SELECTED SEGMENTS OF A SIGNAL

(75) Inventor: Nikhil M. Bhatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 2200 days.

(21) Appl. No.: 11/181,660

(22) Filed: Jul. 13, 2005

(51) Int. Cl.
*G11B 27/02* (2006.01)

(52) U.S. Cl. ....... 386/278; 386/282; 725/37; 369/47.13; 369/83; 715/723

(58) Field of Classification Search ............ 386/46, 386/52, 95, 200, 230, 278, 281, 282; 369/30.05, 369/47.13, 83; 715/723, 732; 725/46, 37, 725/44
See application file for complete search history.

(56) References Cited

U.S. PATENT DOCUMENTS

| | | | |
|---|---|---|---|
| 5,537,530 A * | 7/1996 | Edgar et al. ................ 715/723 |
| 5,675,358 A | 10/1997 | Bullock et al. |
| 5,752,244 A | 5/1998 | Rose et al. |
| 5,999,173 A * | 12/1999 | Ubillos ...................... 715/724 |
| 6,069,995 A * | 5/2000 | Sugiyama et al. ........... 386/241 |
| 6,253,218 B1 | 6/2001 | Aoki et al. |
| 6,298,482 B1 * | 10/2001 | Seidman et al. ............ 725/101 |
| 6,771,285 B1 * | 8/2004 | McGrath et al. ............ 715/723 |
| 7,055,166 B1 * | 5/2006 | Logan et al. ................. 725/32 |
| 7,424,677 B2 * | 9/2008 | Sezan et al. ................ 715/719 |
| 7,454,010 B1 | 11/2008 | Ebenezer |
| 7,702,014 B1 * | 4/2010 | Kellock et al. .......... 375/240.08 |
| 2001/0004268 A1 | 6/2001 | Kubo et al. |
| 2001/0020953 A1 * | 9/2001 | Moriwake et al. .......... 345/723 |
| 2002/0010589 A1 | 1/2002 | Nashida et al. |
| 2002/0180803 A1 | 12/2002 | Kaplan et al. |
| 2002/0188602 A1 * | 12/2002 | Stubler et al. ................. 707/3 |
| 2003/0014135 A1 | 1/2003 | Moulios |
| 2003/0067554 A1 * | 4/2003 | Klarfeld et al. ............. 348/461 |
| 2003/0084065 A1 * | 5/2003 | Lin et al. ................. 707/104.1 |
| 2003/0093445 A1 | 5/2003 | Schick et al. |
| 2003/0093790 A1 * | 5/2003 | Logan et al. ................. 725/38 |
| 2003/0123713 A1 | 7/2003 | Geng |
| 2003/0190090 A1 | 10/2003 | Beeman et al. |
| 2003/0227468 A1 | 12/2003 | Takeda |
| 2004/0024758 A1 | 2/2004 | Iwasaki |

(Continued)

OTHER PUBLICATIONS

Higgins, D., "Wave Corrector v3.0 Vinyl/Tape to CD-R Processing Digital Audio Editing for the PC User Manual," Jul. 22, 2004, Ganymede Test & Measurement, v3.0, from < http://web.archive.org/web/20040722132002/www.wavecor.co.uk/help300.pdf > (86 pgs).

(Continued)

*Primary Examiner* — Thai Tran
*Assistant Examiner* — Mishawn Dunn
(74) *Attorney, Agent, or Firm* — Blakely, Sokoloff, Taylor & Zafman LLP (57) ABSTRACT

Techniques and interface controls are described which allow users of signal editing applications to easily select previously-selected segments of the signal. As the user selects segments of the signal, the signal editing application automatically generates "selection history data". The selection history data that is generated for a selected segment indicates the boundaries of the selected segment, and the sequence in which the selected segment was selected relative to other previously-selected segments. The signal editing application provides controls for re-selecting the previously-selected segments that are reflected in the selection history data. In response to user-input received through these controls, the signal editing tool reselects a previously-selected segment based on the boundaries indicated in the selection history data.

40 Claims, 3 Drawing Sheets

U.S. PATENT DOCUMENTS

| | | |
|---|---|---|
| 2004/0133927 A1 | 7/2004 | Sternberg et al. |
| 2004/0139400 A1 | 7/2004 | Allam et al. |
| 2004/0189827 A1* | 9/2004 | Kim et al. ............... 348/231.4 |
| 2004/0199277 A1 | 10/2004 | Bianchi et al. |
| 2005/0010475 A1 | 1/2005 | Perkowski et al. |
| 2005/0063668 A1* | 3/2005 | Hosoi et al. ................ 386/52 |
| 2005/0192924 A1 | 9/2005 | Drucker et al. |
| 2006/0041613 A1 | 2/2006 | Fackelmayer et al. |
| 2006/0071942 A1 | 4/2006 | Ubillos et al. |
| 2006/0071947 A1 | 4/2006 | Ubillos et al. |
| 2006/0119619 A1 | 6/2006 | Fagans et al. |
| 2006/0248472 A1* | 11/2006 | Helie et al. ................ 715/810 |
| 2009/0138829 A1* | 5/2009 | Ogikubo ................ 715/853 |
| 2010/0303257 A1 | 12/2010 | Moulios et al. |

OTHER PUBLICATIONS

U.S. Appl. No. 10/960,888, filed Oct. 6, 2004, mailed Apr. 23, 2007.
U.S. Appl. No. 11/104,995, filed Apr. 12, 2005, Notice of Allowance, mailed Feb. 17, 2010.
Sonic Foundry, Inc. "Sound Forge 6.0," copyright 2002-2003, Sonic Foundry, Inc. pp. 1-14 and 129-142, http://www.sonycreativesoftware.com/download/manuals/soundforgefamily.
U.S. Appl. No. 11/195,265, filed Aug. 1, 2005, Final Office Action, mailed Mar. 18, 2011.

* cited by examiner

SELECTING PREVIOUSLY-SELECTED SEGMENTS OF A SIGNAL

FIELD OF THE INVENTION

The present invention relates to digital editing and, more specifically, to editing signal data.

BACKGROUND

It is desirable, in a variety of contexts, to capture signals. The nature of the signals may vary from context to context. For example, in a medical context, it may be desirable to capture signals that represent heart activity. In the context of sound studios, it may be desirable to capture audio signals produced by music artists. The techniques described herein are not limited to any particular type of recorded signal. The digital representation of a signal is referred to herein as "signal data".

For a variety of reasons, it may be desirable to edit the signal data after a signal has been digitally recorded. For example, an audio recording of a lecture may include a cough that should be removed. In addition to problems created by the recording environment (such as a coughing audience), the recording process itself may introduce problems, such as hissing or popping noises, that should be removed from the recording.

Many signal editing applications are available for performing post-recording edits to a captured signal. In the context of audio signals, many audio editing applications allow a user to listen to the audio. While the audio is being played, the user is presented with a visual representation of the signal, with an indication of the location, within the signal, that is currently being played. While listening to the audio and watching the visual representation of the signal, the user may identify a problem that requires fixing. For example, the user may hear a "cough", and see a spike that represents the cough in the visual representation of the signal. The user may then use a tool provided by the editing application to correct the problem. For example, the user may replace the segment of the signal that contains the cough with an ambient noise print, as described in U.S. patent application Ser. No. 11/104,995, filed on Apr. 12, 2005 entitled "PRESERVING NOISE DURING EDITING OF A SIGNAL", the contents of which are incorporated herein by this reference.

Many editing operations are performed on selected segments of the signal, rather than on the entire signal. For example, in the operation mentioned above, the user replaces, with ambient noise, only the segment of the signal that contains the cough. To allow users to perform operations that involve segments of a signal, signal editing applications typically have user interface controls that allow a user to select a segment of the signal.

The specific user interface controls that a signal editing application provides for selecting a segment of a signal may vary from application to application. For example, one signal editing application may allow a user to specify "markers" at user-selected points in the visual depiction of the signal. The user may then double-click the cursor between two markers to automatically select the segment of the signal that is bounded by the two markers. As another example, a signal editing application may allow a user to select a segment by (1) pressing down on a mouse button at a first point in the visual depiction of the signal, (2) dragging the cursor to a second point in the visual depiction of the signal, and (3) releasing the mouse button. In response to releasing the mouse button, the segment between the first point and the second point is selected. A single signal editing application may provide numerous alternative techniques for selected segments of the signal. The techniques described herein are not limited to any particular techniques for selecting segments of a signal.

During the editing process, it may be desirable to perform a second editing operation on the same segment on which a first editing operation was previously performed. If the desired segment is still the currently selected segment, then the segment does not have to be re-selected to perform the second operation. However, if the desired segment is no longer selected, then the user must re-select the desired segment.

Manually trying to re-select a previously selected segment is both tedious and error prone. If the user fails to select the exact boundaries of the previously selected segment, then the subsequent editing operation may create more problems that it fixes. For example, assume that a particular segment of an audio signal was previously converted to "silence". At a later point in the editing process, the user may decide to change that particular segment to ambient noise. However, if the user is not able to select the exact boundaries of the segment that was converted to silence, the attempt to convert the segment to ambient noise may leave a small segment of silence.

To assist the user in selecting a previously selected segment, the signal editing application may keep track of previously selected segments. However, without user interface tools that facilitate the selection of previously selected segments, the process of selecting previously-selected segments may still be cumbersome.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques and interface controls are provided which allow users of signal editing applications to easily select previously-selected segments of a signal. According to one embodiment, as the user selects segments of the signal, the signal editing application automatically generates "selection history data". The selection history data that is generated for a selected segment indicates the boundaries of the selected segment, and the sequence in which the selected segment was selected relative to other previously-selected segments. To facilitate the identification of the previously-selected segments, the selection history data may also include user-specified and/or automatically generated labels for some or all of the previously-selected segments.

The signal editing application provides controls for re-selecting the previously-selected segments that are reflected in the selection history data. In response to user-input received through these controls, the signal editing tool reselects a previously-selected segment based on the boundaries indicated in the selection history data. Various user interface controls that facilitate the selection of previously-selected segments are described hereafter in greater detail.

Selection Navigation Tool

Figure 1:
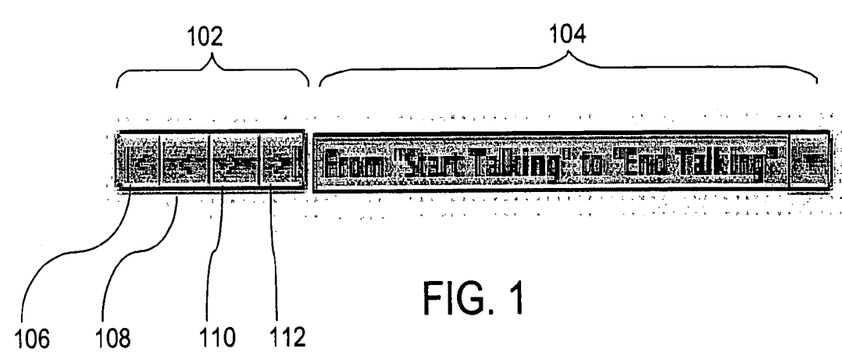
FIG. 1 is a block diagram of a navigation tool for selecting previously-selected segments of a signal, according to an embodiment of the invention.

Referring to FIG. 1, it is a block diagram of a selection navigation tool 100 for navigating through previously-selected segments of a signal, according to one embodiment of the invention. Selection navigation tool 100 includes a browsing tool 102 and a random-access tool 104.

Browsing tool 102 includes several buttons 106, 108, 110 and 112. In response to receiving user input that selects button 106, the signal editing application re-selects the first segment that is reflected in the selection history data. In response to receiving user input that selects button 108, the signal editing application re-selects the segment, within the selection history data, that immediately precedes the currently selected segment. In response to receiving user input that selects button 110, the signal editing application re-selects the segment, within the selection history data, that immediately follows the currently-selected segment. In response to receiving user input that selects button 112, the signal editing application re-selects the last segment that is reflected in the selection history data.

According to one embodiment, the buttons of browsing tool 102 are displayed with different visual depictions depending on whether the operations that correspond to the buttons are available. For example, if the user has not yet selected any segment, then the selection history data will be empty, and all of the buttons may be displayed as "inactive". For the purpose of illustration, assume that the user then selects a segment S1 of the signal. In response to the user's selection of a segment, the signal editing application stores an entry in the selection history data for the segment S1. The entry may indicate the boundaries of S1, and that S1 is sequentially the first segment that the user selected.

At this point, buttons 106, 108, 110 and 112 may remain inactive, since there is no "first", "previous", "next" or "last" selected segment in the selection history data other than the currently selected segment. Buttons 106 and 108 become active when at least one segment precedes the currently selected segment in the selection history data. Similarly, buttons 110 and 112 become active when at least one segment follows the currently selected segment in the selection history data.

Assume that the user then selects another segment S2 of the signal. In response to the user's selection of segment S2, the signal editing application stores an entry in the selection history data for segment S2. The entry for S2 may indicate the boundaries of S2, and that S2 is sequentially the second segment that the user selected.

At this point, buttons 106 and 108 may become active, since there is a previously-selected segment, within the selection history data, that precedes the currently selected segment (S2). Selection of button 106 would cause segment S1 to be re-selected, since segment S1 is the first segment reflected in the selection history data. Selection of button 108 would cause segment S1 to be re-selected, since segment S1 immediately precedes the currently selected segment (S2) within the selection history data. Buttons 110 and 112 would continue to be inactive, since there are no segments, within the selection history data, that follow the currently-selected segment (S2).

Assume that the user selects button 108, causing segment S1 to be re-selected. In addition to re-selecting segment S1, selection of button 108 causes buttons 110 and 112 to become active. Button 110 becomes active because the selection history data includes an entry for a segment (S2) that follows the entry for the currently-selected segment (S1). Selection of button 110 at this point would cause segment S2 to once again be selected, and button 110 to become inactive.

It should be noted that the sequence used by browsing tool 102 is the sequence in which the segments were selected, as indicated in the selection history data, and does not necessarily correspond to the relative sequence of the segments within the signal itself. Thus, segment S2 may be sequentially after segment S1 in the selection history data, even though segment S2 precedes segment S1 in the signal.

Random Access Selection of Previously-Selected Segments

Referring again to FIG. 1, navigation tool 100 also includes a random-access tool 104. Random-access tool 104 provides controls that allow the user to directly select any of the segments reflected in the selection history data. According to one embodiment, random-access tool 104 includes a control which, when selected, presents the user with indicators for each of the segments reflected in the selection history data. In response to user input that selects one of the indicators, the signal editing tool re-selects the segment that corresponds to the selected indicator.

In the illustrated example, random-access tool 104 includes a pull-down menu. When the pull-down menu control is selected, the user is presented with a list of menu items. The menu items are labels that correspond to the segments reflected in the selection history data. In response to user input that selects the label associated with a particular segment, the signal editing application (1) selects the segment that corresponds to the selected label, (2) ceases to display the list of labels, and (3) displays the label associated with the selected segment. In the example shown in FIG. 1, the random-access tool 104 displays the label "From 'Start Talking' to 'End Talking'", indicating that the segment associated with that label is the currently-selected segment.

To facilitate the use of the random-access tool 104, the labels that are presented to the user should be meaningful to the user. Various techniques for associating meaningful labels with selected segments shall now be described in greater detail.

User-Specified Segment Labels

According to one embodiment, the signal editing application may include controls that allow users to specify the labels that are used to identify segments within the selection history data. For example, while listening to playback of an audio signal, a user may notice a cough. The user may then select the segment of the signal in which the cough occurs, and assign that segment the label "cough". The signal editing application stores the label "cough" in the entry, within the selection history data, for that particular segment. Consequently, at a future point in the editing process, the user may use the random access tool 104 to select the label "cough" to cause the segment of the audio signal that contains the cough to be selected.

Automatically Generated Segment Labels

Instead of or in addition to user-specified labels, the signal editing tool may include a mechanism for automatically generating labels for selected segments. Such automatically generated labels may be stored in the selection history data, along with the other information about the previously-selected segments.

A variety of techniques may be used to automatically generate meaningful labels for selected segments. The signal editing application may, for example, create a label for a selection based on a variety of criteria, including but not limited to: start point, duration, frame, zero-crossing points, and markers. For example, in an embodiment where the boundaries of a selected segment are identified by two markers, a label for the segment may be automatically generated based on the labels associated with the two markers. Thus, the label "From 'Start Talking' to 'End Talking'" may be automatically generated in response to user selection of a segment that extends from a marker labeled "Start Talking" to a marker labeled "End Talking".

Automatically generated labels may also reflect other meaningful points within the signal. For example, the label "From 'Signal Start' to 'Start Talking'" may be automatically generated for a selected segment that extends from the beginning of the signal to a marker that is labeled "Start Talking". Similarly, the label "From 'End Talking'" to 'Signal End' may be automatically generated for a selected segment that extends from a marker labeled "End Talking" to the end of the recorded signal.

These are merely examples of techniques that may be used for automatically generating meaningful labels that are presented to the user by the random-access tool 104. The user may override such automatically-generated labels with user-specified labels, as described above. According to one embodiment, the label associated with the currently-selected segment is displayed by navigation tool 100, regardless of whether the segment was selected using the browsing tool 102 or the random-access tool 104.

Durably Storing the Selection History Data

It is not uncommon for users to perform editing operations in multiple sessions. For example, a user may launch a signal editing application, perform a few edit operations, save the changes, and close the signal editing application. At a later point in time, the user may launch the signal editing application again, perform a few more edit operations, save the changes, and close the signal editing application.

During one editing session, the user may want to perform an edit operation to a segment that was selected during a previous editing session. Therefore, according to one embodiment, the signal editing tool includes a mechanism for durably storing the selection history data within, or in conjunction with, the file that includes the signal data. When the signal editing application loads the signal data from the file, the signal editing application also loads selection history data that was stored for the signal. As a result, the user is able to easily select in one session segments that were previously selected in other sessions.

Clearing/Purging Selection History Data

It may not be necessary or even desirable to keep track of every segment that is selected during the editing of a signal. Therefore, various techniques are provided by which the user may explicitly or implicitly purge entries from the selection history data.

According to one embodiment, when a user moves through the selection history and then makes a new selection, some elements are automatically purged from the history. For example, a history may contain the following selections:
Selection 1
Selection 2
Selection 3
Selection 4

A user may navigate to Selection 2 and then make a new Selection 5. According to one embodiment, selecting a new segment after navigating to a particular previously-selected segment causes all segments that follow the particular previously-selected segment to be purged from the history. After such a purge, the history would contain the following entries:
Selection 1
Selection 2
Selection 5

Thus, Selections 3 and 4 have been removed from the history.

Automatically deleting subsequent entries in this manner is not always desirable, especially for user-named selections. According to one embodiment, user-named selections are not implicitly purged in this manner, but are retained and displayed in a separate user interface element. For example, such user-named selections may be displayed in a pop-up menu between the arrow buttons (where users would also name new selections).

Instead of or in addition to implicit purging, the user may be provided with controls that allow the user to purge (1) all entries in the selection history, (2) all entries other than user-labeled entries, (3) a selected range of entries, and/or (4) selected individual entries. In this manner, the user may retain the selection history entries for important segments, while still pruning the selection history list down to a manageable number of entries.

Depicting the Selected Segment

Figure 2:
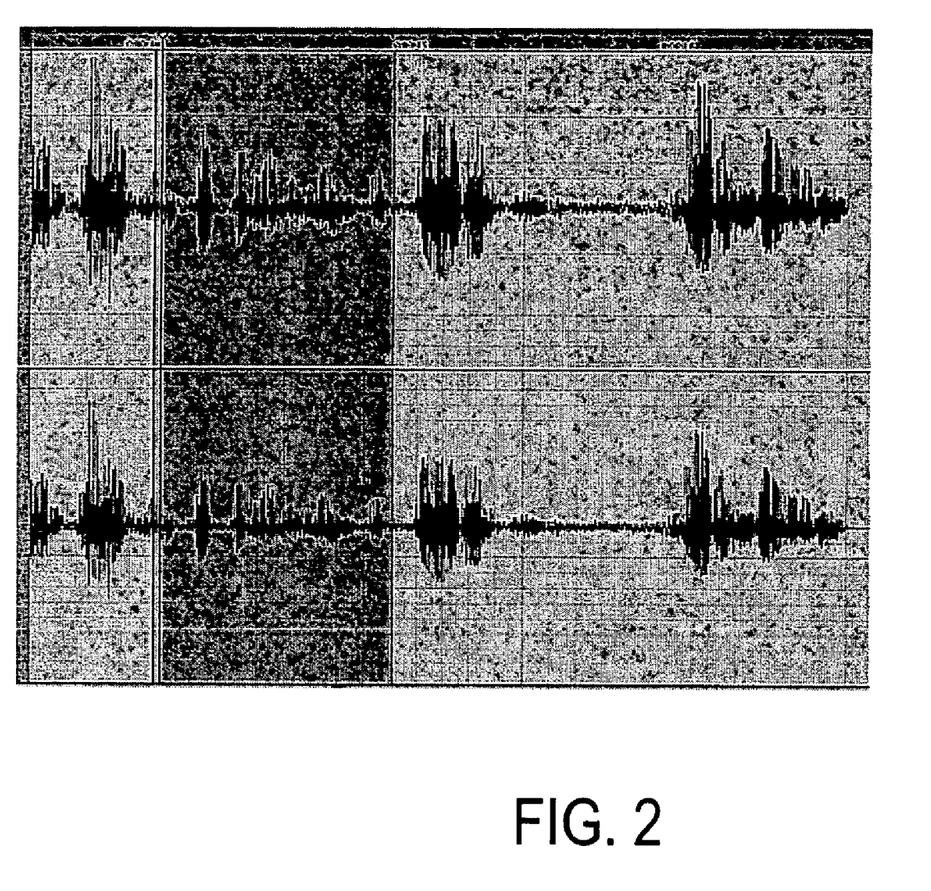
FIG. 2 is a block diagram that illustrates the visual depiction of a signal, according to an embodiment of the invention.

Many signal editing applications generate visual depictions of a signal. An example of such a depiction is illustrated in FIG. 2. When a segment of the signal is selected, the selected segment is typically shown in a manner that visually distinguishes the selected segment from the rest of the signal.

According to one embodiment, when the navigation tool 100 is used to select a previously-selected segment, the visual depiction of the signal is modified accordingly. The modification includes (1) depicting the portion of the signal that contains the newly selected segment, and (2) depicting the newly selected segment in a manner that visually distinguishes the segment from the remainder of the signal.

Representing Selection Boundaries

As mentioned above, the selection history data includes information that indicates the boundaries of previously-selected signal segments. According to one embodiment, the boundaries are stored as sample ranges. For example, for a particular selection, the selection history data may include information about the sample numbers of the samples, within the signal data, that correspond to the boundaries of the selection. Thus, in an audio file that includes 10,000 samples, a particular signal segment may correspond to sample 500 to sample 2000. When the particular segment is selected, the signal editing application may store the range (500, 2000) in the selection history data to identify the selected segment.

Unfortunately, due to insertion or deletion operations, the sample range that is stored in the selection history data to identify a previously-selected segment may no longer correspond to the signal data that was in the previously-selected segment. For example, a user may select the first 1000 samples of a file, then insert 2000 samples at the front of the file, and then use the selection history. If only sample numbers are stored in the selection history data, then the selection history would highlight the first 1000 samples, which actually were just inserted (and not the same ones that the user originally selected). However, the data the user typically wants under these circumstances is now sample range 2000-2999, which contains the "sounds" the user selected originally. Based on the time range information, the proper range can be re-selected.

Instead of or in addition to using sample ranges, the boundaries of selections may be represented, within the selection history data, by time ranges. Thus, a selected segment that begins with a sample taken at time T5 and ending with a sample taken at time T50 may be represented, within the selection history data, by the time range (T5, T50). Unlike sample numbers, the time values associated with samples do not change when the samples are moved around within the audio file. Thus, the use of time ranges to record the boundaries of selections is especially useful when users are performing insertion and deletion operations, and when users name selections [e.g., "cough"].

By storing the selections as time ranges, the signal editing application is able to adjust the selection history when insert/deletes occur. In addition, if the selection history data stores both the sample range and the time range, then the signal editing application can provide users with the option of jumping to either the time-based selection or the sample range-based selection. If the sample range does not equal the time range, then the signal editing application may ask the user (via preference or dialog) which of the two ranges to use. On the other hand, if the sample range equals the time range, then the user would not be asked.

Storing Parameter Values in the Selection History Data

According to one embodiment, various parameter values may be stored in the selection history data entry of a previously-selected segment. The parameter values may reflect, for example, the state of the signal editing application at the time that the segment was originally selected. In response to user input that selects a previously-selected segment using the navigation tool 100, the signal editing application assigns the parameter values from the segment's entry to the corresponding operational parameters of the signal editing application. As a result, selection of a previously-selected segment restores some properties of the signal editing tool to the state that the signal editing application was in at the time the segment was originally selected.

For example, consider the visual depiction of the signal that is illustrated in FIG. 2. At any given time, the depiction of the signal represents the signal at a particular "zoom" level. The zoom level determines the number of pixels that are used per unit of the signal. Thus, at a low zoom level, a second's worth of audio signal may be depicted in 10 pixels along the x-axis. At a higher zoom level, the same second's worth of audio signal may be depicted in 1000 pixels along the x-axis.

The zoom level of the visual depiction of the signal is an example of a parameter value that may be stored as part of the selection history data. For example, assume that the visual depiction of the signal is at zoom level 5 when a segment S1 is selected. In response to the selection, the signal editing application stores in the selection history data (1) the boundaries of S1, (2) a sequence indicator for S1, (3) an automatically-generated label for S1, and (4) an indication that S1 was selected at zoom level 5.

After 51 has been selected, the user may change the zoom level, and perform any number of subsequent operations. However, when the user uses the navigation tool 100 to re-select segment S1, the signal editing application automatically restores the zoom level to zoom level 5.

Variations and Enhancements

The selection history tools and techniques described herein may be enhanced in a variety of ways. For example, in one embodiment, empty selections (where there is a starting point in the timeline, but zero duration) can be optionally added to the selection history, via user preference. As another example, the signal editing tool may be configured to identify and merge the entries for identical selections. For example, when two selections are identical and are adjacent in the selection history, the signal editing tool may be configured to retain a selection history entry for only one of the selections.

This techniques described herein can be applied in a variety of contexts, including audio waveform applications, as well for multitrack applications (in audio, video, or other timeline-oriented applications). The techniques may be used to record selections made directly to data, as well as to rulers, clips, and other such user interface elements. When applied to clips and other such well-named elements, the automatic naming function is particularly useful.

Hardware Overview

Figure 3:
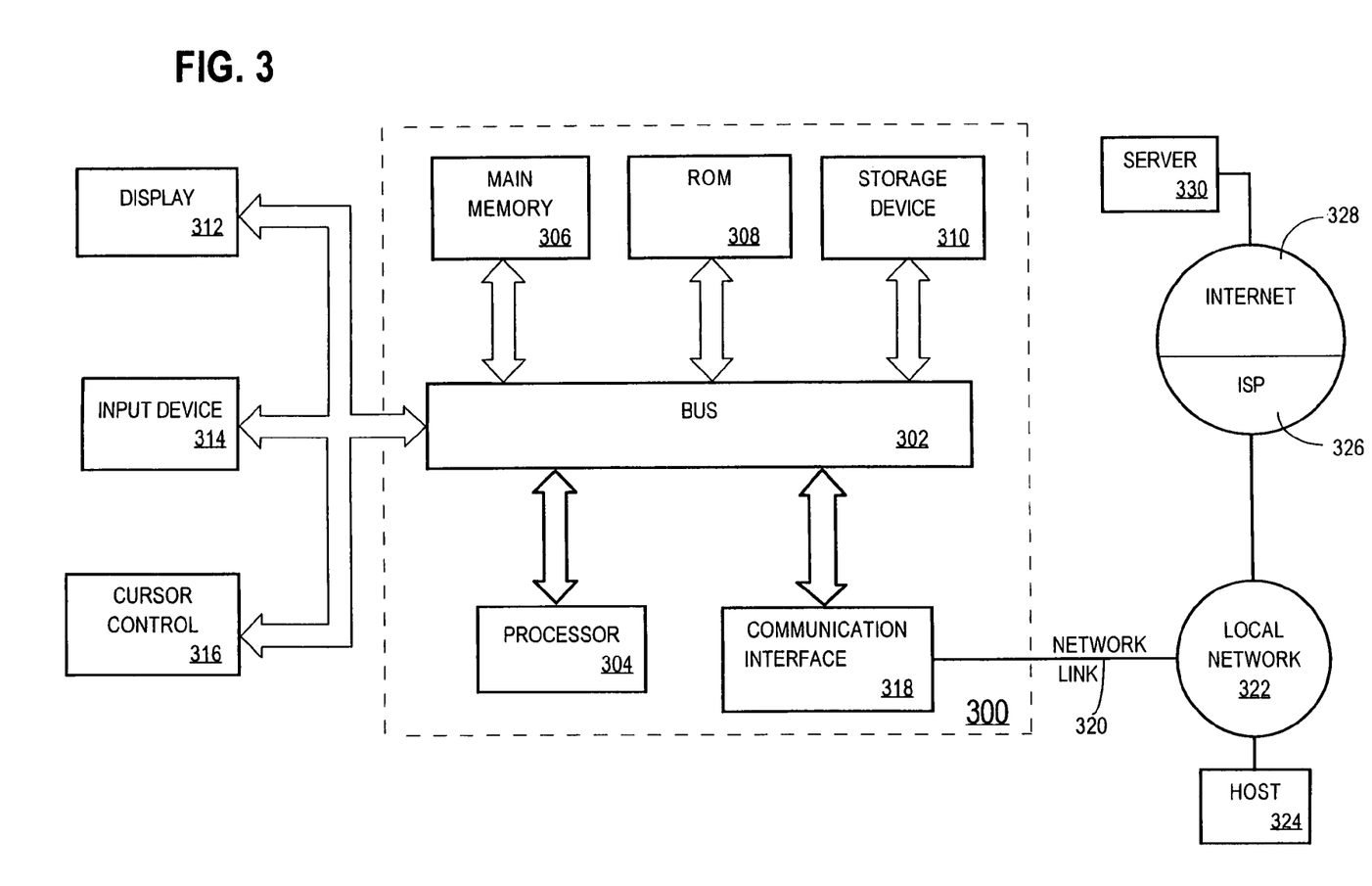
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for selecting previously-selected segments of a signal, the method comprising:
    reading signal data from a file that is an encoding of said signal;
    based on the signal data read from the file, a signal editing application generating a visual depiction of said signal;
    receiving, through a segment selection interface, input that specifies boundaries of a segment;
    in response to receiving the input, generating an entry and storing the entry in selection history data;
    wherein the selection history data includes a plurality of entries, wherein said entry is one of the plurality of entries;
    wherein each entry of the plurality of entries corresponds to a segment of said signal that was previously selected based on user interaction;
    wherein each entry of the plurality of entries includes information that identifies the boundaries of the corresponding segment;

generating user interface controls that allow a user of the signal editing application to select a segment from among the segments that are identified in said selection history data; and in response to input that selects a segment identified in said selection history data, reading information from the entry for the segment to determine the boundaries of the segment, and establishing the segment as the currently selected segment within said signal editing application;

wherein the method is performed by one or more computing devices.

2. The method of claim 1 wherein each entry further includes a sequence value that indicates the sequence in which the corresponding segment was selected relative to when other segments reflected in the selection history data were selected.

3. A non-transitory computer-readable medium carrying instructions which, when executed by one or more processors, causes the performance of the method recited in claim 2.

4. The method of claim 2 wherein the user interface controls include controls that allow a user to browse through the segments reflected in the selection history data in an order that reflects the sequence values stored in the entries within the selection history data.

5. A non-transitory computer-readable medium carrying instructions which, when executed by one or more processors, causes the performance of the method recited in claim 4.

6. The method of claim 4 wherein:

the user interface controls include a control for selecting the segment that immediately precedes the currently selected segment; and the control is displayed in an inactive state when the selection history data does not include an entry for any segment that precedes the currently selected segment.

7. A non-transitory computer-readable medium carrying instructions which, when executed by one or more processors, causes the performance of the method recited in claim 6.

8. The method of claim 4 wherein:

the user interface controls include a control for selecting the segment that immediately follows the currently selected segment; and the control is displayed in an inactive state when the selection history data does not include an entry for any segment that follows the currently selected segment.

9. A non-transitory computer-readable medium carrying instructions which, when executed by one or more processors, causes the performance of the method recited in claim 8.

10. The method of claim 1 wherein each entry further includes a label associated with the corresponding segment.

11. A non-transitory computer-readable medium carrying instructions which, when executed by one or more processors, causes the performance of the method recited in claim 10.

12. The method of claim 10 further comprising automatically generating the label associated with a segment in response to user selection of the segment.

13. A non-transitory computer-readable medium carrying instructions which, when executed by one or more processors, causes the performance of the method recited in claim 12.

14. The method of claim 1, wherein:

the segment is selected based on one or more markers; and
the label for the segment is automatically generated based on labels associated with the one or more markers.

15. A non-transitory computer-readable medium carrying instructions which, when executed by one or more processors, causes the performance of the method recited in claim 14.

16. The method of claim 10 further comprising providing a mechanism by which users may specify labels for segments.

17. A non-transitory computer-readable medium carrying instructions which, when executed by one or more processors, causes the performance of the method recited in claim 16.

18. The method of claim 10 further comprising:

displaying to a user the labels associated with the segments represented in the selection history data;

receiving first input that selects a label; and in response to the first input, establishing segment associated with the label as the currently selected segment.

19. A non-transitory computer-readable medium carrying instructions which, when executed by one or more processors, causes the performance of the method recited in claim 18.

20. The method of claim 1 further comprising durably storing the selection history data that was generated during one editing session of the signal, and reloading the selection history data during a subsequent editing session of the signal.

21. A non-transitory computer-readable medium carrying instructions which, when executed by one or more processors, causes the performance of the method recited in claim 20.

22. The method of claim 1 wherein:

the signal that is encoded in the file has a starting point; and the information, within an entry, that identifies the boundaries of the corresponding segment includes information that identifies a time range, of the corresponding segment, relative to the starting point of the signal.

23. A non-transitory computer-readable medium carrying instructions which, when executed by one or more processors, causes the performance of the method recited in claim 22.

24. The method of claim 1 wherein the information, within an entry, that identifies the boundaries of the corresponding segment includes information that identifies both a time range of the corresponding segment, and a sample range of the corresponding segment.

25. A non-transitory computer-readable medium carrying instructions which, when executed by one or more processors, causes the performance of the method recited in claim 24.

26. A non-transitory computer-readable medium carrying instructions which, when executed by one or more processors, causes the performance of the method recited in claim 1.

27. The method of claim 1, wherein the input specifies a first user-specified point on the visual depiction of said signal and a second user-specified point on the visual depiction of said signal.

28. A non-transitory computer-readable medium carrying instructions which, when executed by one or more processors, causes the performance of the method recited in claim 27.

29. The method of claim 1, wherein the information, within an entry of the plurality of entries, that identifies the boundaries of the corresponding segment includes information that identifies a sample range of the corresponding segment.

30. A non-transitory computer-readable medium carrying instructions which, when executed by one or more processors, causes the performance of the method recited in claim 29.

31. A method for selecting previously-selected segments of a signal, the method comprising:
- a signal editing application generating a visual depiction of said signal;
- generating selection history data in response to user interaction with a segment selection interface that includes the visual depiction of said signal;
- wherein the selection history data includes a plurality of entries;
- wherein each entry of the plurality of entries corresponds to a segment of said signal that was selected during said user interaction;
- wherein each entry includes information that identifies the boundaries of the corresponding segment;
- storing, in an entry, of the plurality of entries, that is associated with a particular segment, one or more parameter values, of the signal editing application, that were in effect at the time the particular segment was selected, wherein the one or more parameter values reflect the state of the signal editing application at the time the particular segment was originally selected; and
- in response to input that re-selects the particular segment based on said selection history data, assigning the one or more parameter values to operational parameters of said signal editing application;
- wherein the method is performed by one or more computing devices.

32. The method of claim 31 wherein:
the signal editing application generates a visual depiction of the signal.

33. A non-transitory computer-readable medium carrying instructions which, when executed by one or more processors, causes the performance of the method recited in claim 32.

34. A non-transitory computer-readable medium carrying instructions which, when executed by one or more processors, causes the performance of the method recited in claim 31.

35. A method for selecting segments of a signal, the method comprising:
- receiving first input that causes a signal editing application to perform a first edit operation on a first segment of the signal, wherein the first segment of the signal is modified based on the performance of the first edit operation;
- generating a first entry in response to performing the first edit operation on the first segment, wherein the first entry corresponds to the first segment on which the first edit operation was performed;
- storing the first entry in selection history data;
- receiving second input that causes the signal editing application to perform a second edit operation on a second segment of the signal, wherein the second segment of the signal is modified based on the performance of the second edit operation;
- generating a second entry in response to performing the second edit operation on the second segment, wherein the second entry corresponds to the second segment on which the second edit operation was performed;
- storing the second entry in the selection history data;
- generating user interface controls that allow a user of the signal editing application to select a segment from among the segments identified in said selection history data; and
- in response to third input that selects a particular segment identified in said selection history data, reading information from the entry that corresponds to the particular segment to determine the boundaries of the particular segment, and establishing the particular segment as the currently selected segment within said signal editing application;
- wherein the method is performed by one or more computing devices.

36. The method of claim 35, wherein:
- generating the user interface controls comprises displaying a list of labels, wherein each label in the list corresponds to an entry of the plurality of entries; and
- the third input selects a label that corresponds to the particular segment.

37. A non-transitory computer-readable medium carrying instructions which, when executed by one or more processors, causes the performance of the method recited in claim 36.

38. The method of claim 35, wherein:
- the signal is an audio signal;
- the first input is received while a visual depiction of the audio signal is displayed.

39. A non-transitory computer-readable medium carrying instructions which, when executed by one or more processors, causes the performance of the method recited in claim 38.

40. A non-transitory computer-readable medium carrying instructions which, when executed by one or more processors, causes the performance of the method recited in claim 35.

* * * * *